United States Patent [19]

Futcher et al.

[11] Patent Number: 5,722,413
[45] Date of Patent: Mar. 3, 1998

[54] MEDICAL DEMONSTRATION APPARATUS

[75] Inventors: Robert William Futcher; Graham Frederick Orr, both of Glenorie, Australia

[73] Assignee: CorTech Development Pty Ltd., Glenorie, Australia

[21] Appl. No.: 707,809

[22] Filed: Aug. 30, 1996

Related U.S. Application Data

[63] Continuation of Ser. No. 184,621, filed as PCT/AU92/00365, Jul. 17, 1992, abandoned.

[30] Foreign Application Priority Data

Jul. 19, 1991 [AU] Australia .................. PK7348

[51] Int. Cl.$^6$ ........................ G09B 23/28
[52] U.S. Cl. ................ 128/668; 434/267; 434/272
[58] Field of Search ................ 128/668, 684, 128/685; 434/267, 272

[56] References Cited

U.S. PATENT DOCUMENTS

| | | |
|---|---|---|
| 2,437,861 | 3/1948 | Rohr .......................... 128/684 |
| 2,624,334 | 1/1953 | Epstein ....................... 128/865 |
| 3,670,720 | 6/1972 | Panzer ........................ 128/685 |
| 4,050,311 | 9/1977 | Leach ......................... 128/685 |
| 4,146,018 | 3/1979 | Aldridge et al. ............ 128/685 |
| 4,254,562 | 3/1981 | Murray . | |

FOREIGN PATENT DOCUMENTS

| 0166828 | 1/1986 | European Pat. Off. ........ F04B 33/00 |
|---|---|---|
| 9302439 | 4/1993 | WIPO . |

OTHER PUBLICATIONS

PCT International Search Report PCT/AU92/00365, Jul. 17, 1992.

*Primary Examiner*—Robert L. Nasser
*Attorney, Agent, or Firm*—Quarles & Brady

[57] ABSTRACT

A medical demonstration apparatus (1) adapted for indicating cardiac exertion. The apparatus (1) comprises an elastically and recoverably defomable hollow bulb (3) in the shape of a heart. The bulb (3) is connected via a connector (4) nd the tube (5) to a manometer (2) which is used to indicate blood pressure. The bulb (3) is able to be squeezed to indicate the cardiac exertion required to reach a predetermined pressure as indicated on the manometer (2).

5 Claims, 9 Drawing Sheets

MEDICAL DEMONSTRATION APPARATUS

This is a continuation of application Ser. No. 08/184,621 filed Jan. 18, 1994, abandoned, which is a continuation-in-part of PCT application Ser. No. PCT/AU92/00365, filed 17 Jul. 1992, designating the United States.

The present invention relates to medical demonstration apparatus and particularly discloses apparatus that provides an indication of cardiac exertion.

BACKGROUND ART

There exist a number of difficulties for the medical practitioner involved in treating patients suffering from high blood pressure. One major problem is an absence of noticeable symptoms. Thus convincing the patient of the existence of the illness and educating the patient in altering his life style and/or taking a course of medication in order to lessen, or substantially eliminate the condition can often be difficult. This applies especially where there are language and/or educative barriers.

As persons suffering from high blood pressure do not generally feel any symptoms, not only may they not feel the need to change their lifestyle or start a course of medication prescribed by the medical practitioner, but they also may not feel the need to continue. In addition, once a course of medication has been started, the patient does not necessarily feel any improvement and therefore this normal incentive to continue with the medication may be absent.

It has been known to use a partially inflated cuff of a sphygmomanometer to demonstrate the increased force required to emulate patient's blood pressure. However this is a static demonstration using a device which is in fact purpose-built to measure blood pressure; it is in practice rarely used for aforementioned demonstration purposes.

It is also known to provide a medical demonstration apparatus as described in WO 93/02439 by the applicant of the present application. The apparatus as described in that specification includes a recoverably deformable bulb which is connected via tubing to a manometer. The disclosure of that specification is included herein by cross-reference.

OBJECT OF THE INVENTION

It is an object of the present invention to substantially overcome or ameliorate the above mentioned problems through provision of a medical demonstration apparatus that assists in educating a patient by demonstrating levels of cardiac exertion.

DISCLOSURE OF THE INVENTION

In accordance with one aspect of the present invention there is disclosed a medical demonstration apparatus adapted to indicate cardiac exertion to a patient, said apparatus comprising an elastically and recoverably deformable hollow bulb, a connector tube inter-connecting the interior of said bulb with a manometer to indicate air pressure applied to sold manometer via said tube, and a two way flow restrictor inter-connected between said manometer and sold bulb to restrict the flow in either direction through said tube wherein cyclic deformation of said bulb forces air from said bulb towards said manometer at a rate faster than said restrictor permits flow from sold manometer to said bulb to thereby progressively increase the pressure applied to said manometer, and upon cessation of said deformation to slowly reduce the pressure applied to sold manometer.

Preferably, the restricted outlet includes a tube with an internal diameter of approximately 1mm. which ensures that the passage of air is restricted and the manometer level can be maintained for demonstration purposes.

In another preferred embodiment, the restricted opening includes a variable resistance. In a further preferred embodiment a one-way inlet is provided in the bulb to allow air to enter the bulb from the atmosphere.

In a further preferred embodiment, a bleed line to atmosphere from the bulb prevents buildup of pressure within the bulb.

In accordance with another aspect of the present invention there is disclosed a medical demonstration apparatus adapted to indicate cardiac exertion to a patient, said apparatus comprising an elastically and recoverably deformable hollow bulb, a connector tube interconnecting the interior of said bulb with a manometer to indicate air pressure applied to said manometer via said tube, a primary one way valve means interposed between said bulb and manometer, and bleed means connected to said manometer to slowly reduce the pressure applied thereto, and said bulb, manometer valve, bleed means and tube forming a pneumatic circuit arranged upon cyclic deformation of said bulb to progressively increase the pressure applied to said manometer, and upon cessation of said deformation to slowly reduce the pressure applied to sold manometer.

As will be described, the preferred embodiment of the present invention is specifically designed as a visual and tactile interactive simulation device whose purpose is primarily to impart the concepts of blood pressure, cardiac exertion and peripheral resistance. Thus:

- it is visually reinforcing (it can be a model of a human heart);
- it demonstrates the effect of drug and other therapy on peripheral resistance;
- it demonstrates the influence of heart rate;
- it demonstrates the way in which elevated blood pressure increases the demand for coronary blood flow
- it demonstrates how external cardiac massage works;
- it demonstrates why the heart muscle may enlarge as a result of long standing hypertension;
- it is best used as a dynamic model, requiring repeated application of pressure to maintain the desired effect.

BRIEF DESCRIPTION OF THE DRAWINGS

Preferred embodiments of the present invention will now be described with reference to the drawings in which.

BEST MODE OF CARRYING OUT THE INVENTION

Figure 1:
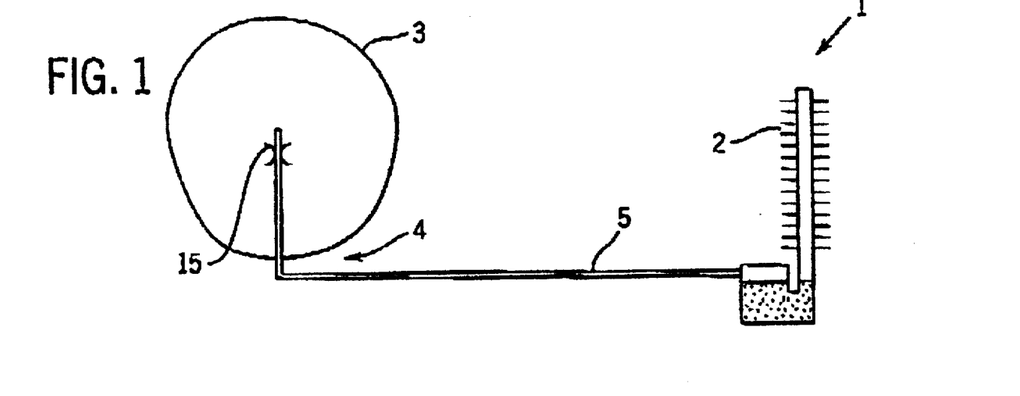
FIG. 1 is a schematic diagram of the medical demonstration apparatus of a first embodiment.
Figure 2:
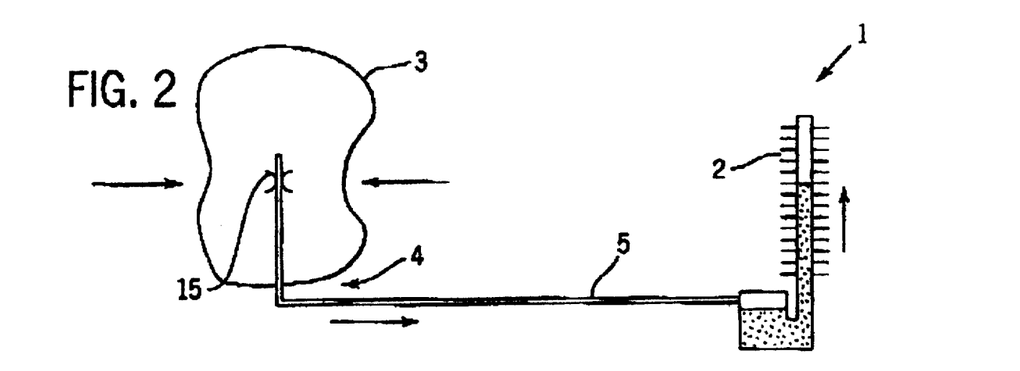
FIG. 2 is a schematic diagram of the medical demonstration apparatus of FIG. 1 when pressure is applied.
Figure 3:
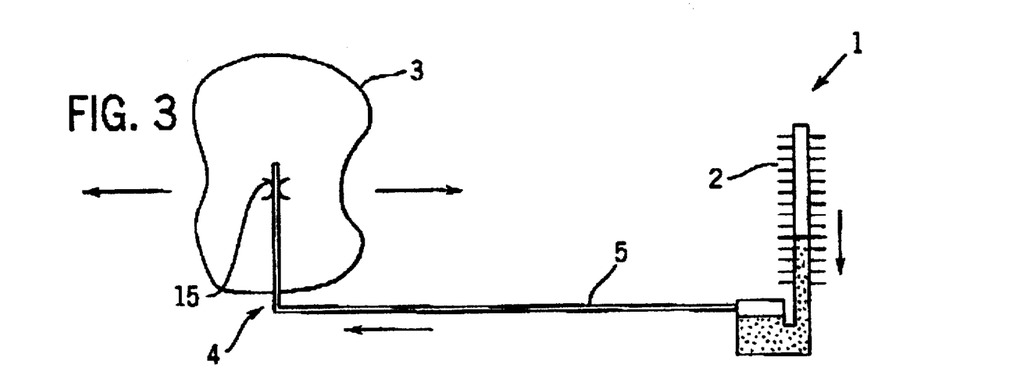
FIG. 3 is a schematic diagram of the medical demonstration apparatus of FIG. 1 when pressure is released.
Figure 4:
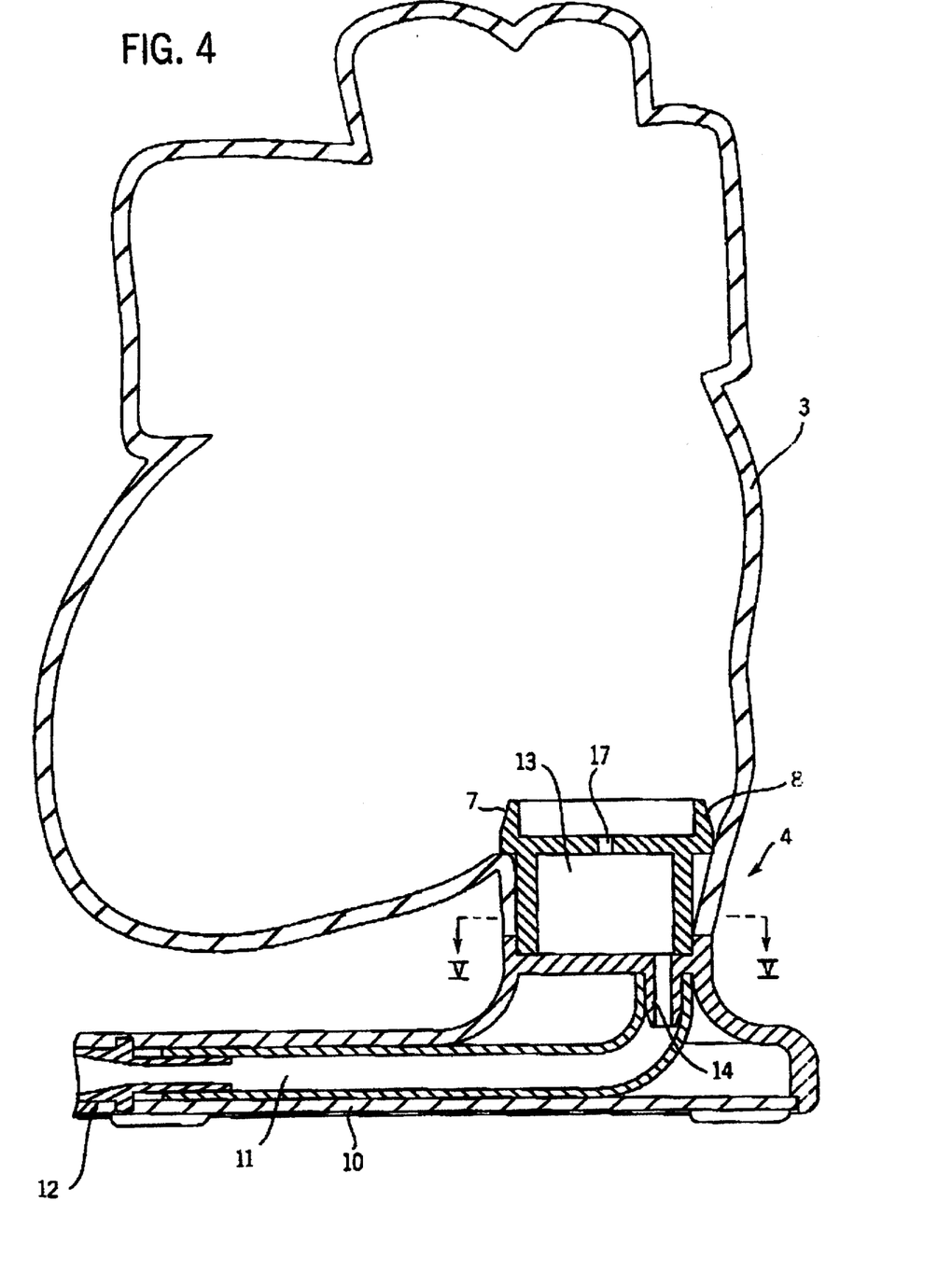
FIG. 4 is a longitudinal cross-sectional view of the medical demonstration apparatus illustrating the heart shaped bulb and its base.

Referring to FIGS. 1–3, the medical demonstration apparatus 1 of a first embodiment comprises an interconnected manometer 2 and bulb 3. As illustrated in FIG. 4, the interconnection is via a connector 4 and tube 5. The connector 4 is illustrated in schematic form in FIGS. 1–3 and the manometer 2 is connected to the connector 4 by a tube 5 as illustrated in FIGS. 1–3.

Referring to FIG. 4, the bulb 3 is made from a moulded plastics material and is preferably coloured and shaped to resemble a human heart. The bulb 3 has a single opening 6 which sealing fits over a ringed flange 7 of an inlet 8 of the connector 4. When the bulb 3 is squeezed and then released, air is forced out of and into the bulb 3 accordingly.

Figure 5:
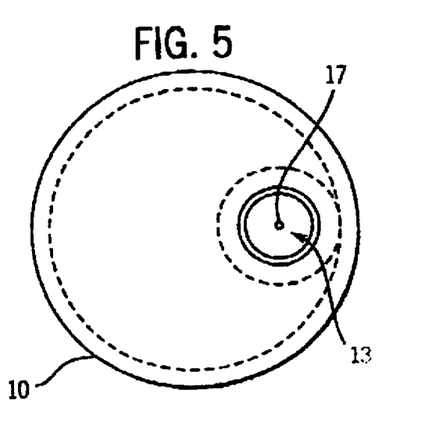
FIG. 5 is a cross-sectional view along the lines V—V of FIG. 4.
Figure 6:
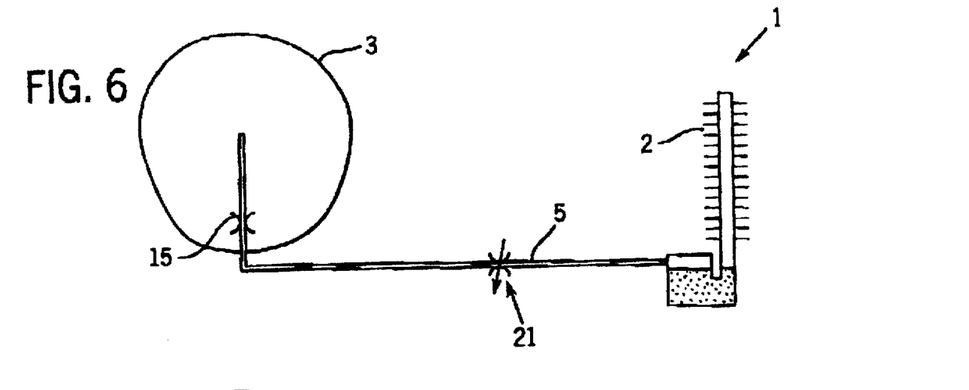
FIG. 6 is a schematic diagram of the medical demonstration apparatus of a said embodiment.
Figure 7:
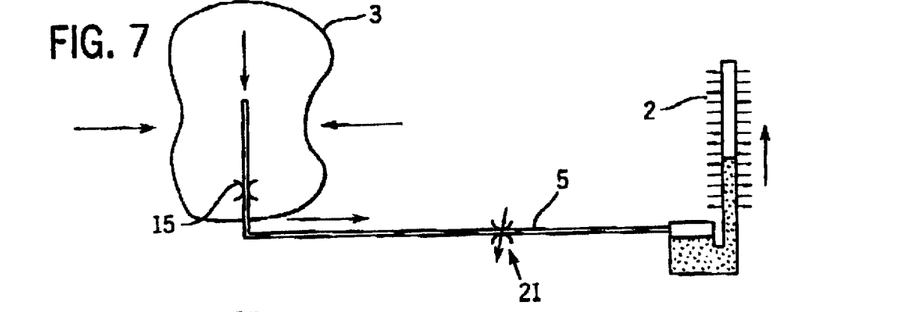
FIG. 7 is a schematic diagram of the medical demonstration apparatus of FIG. 6 when pressure is applied.
Figure 8:
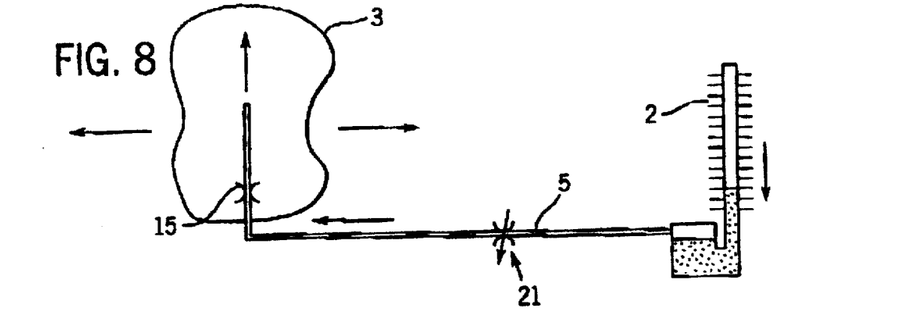
FIG. 8 is a schematic diagram of the medical demonstration apparatus of FIG. 6 when pressure is released.
Figure 9:
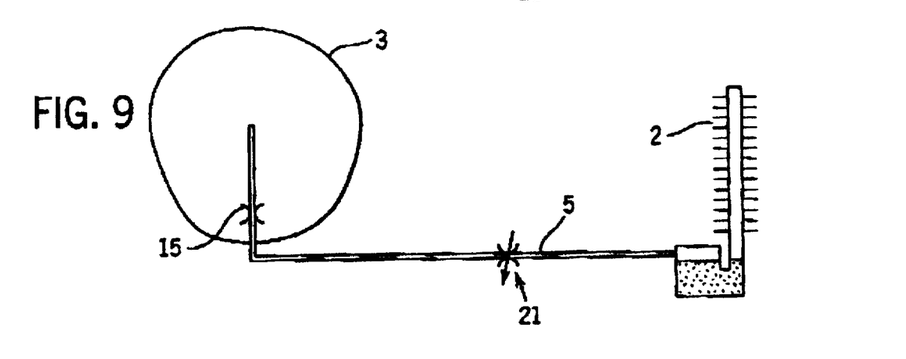
FIG. 9 is a schematic diagram of the medical demonstration apparatus of FIG. 6 following the release of pressure.
Figure 10:
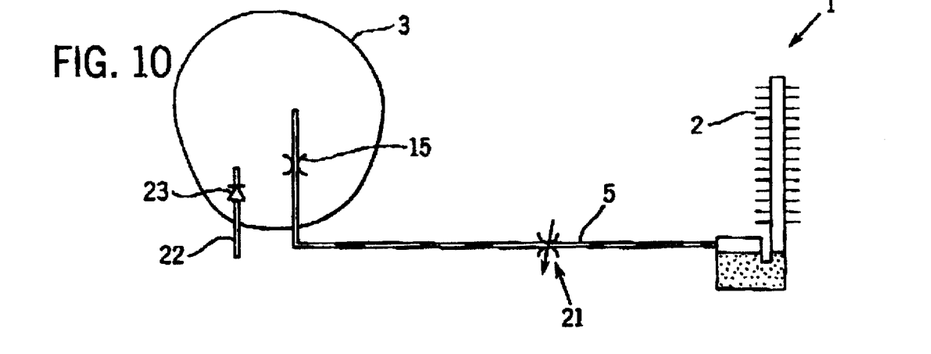
FIG. 10 is a schematic diagram of the medical demonstration apparatus of a third embodiment.
Figure 11:
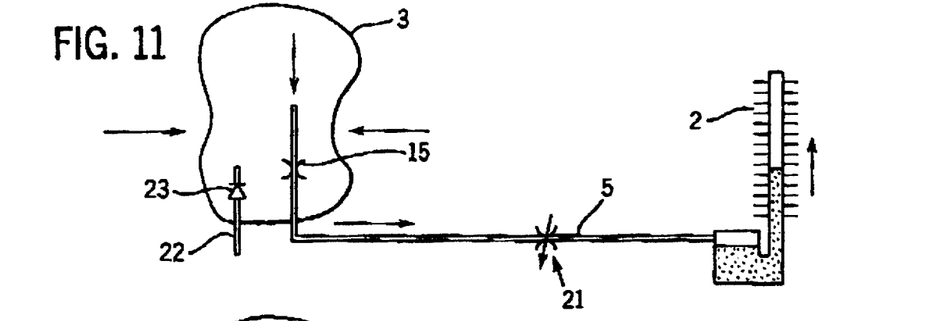
FIG. 11 is a schematic diagram of the medical demonstration apparatus of FIG. 10 when pressure is applied.
Figure 12:
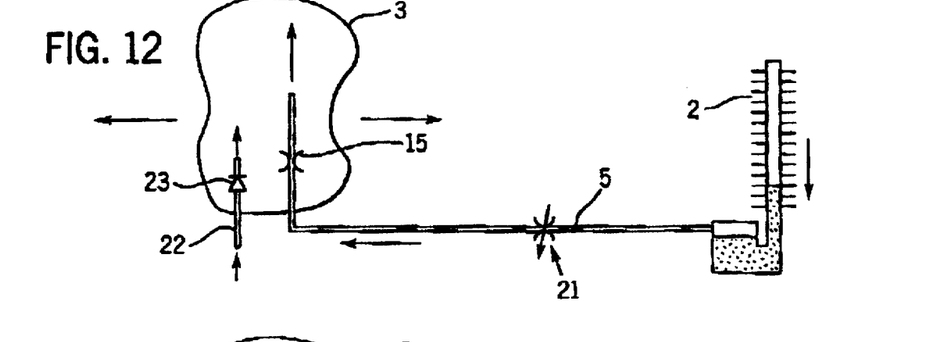
FIG. 12 is a schematic diagram of the medical demonstration apparatus of FIG. 10 when pressure is released.
Figure 13:
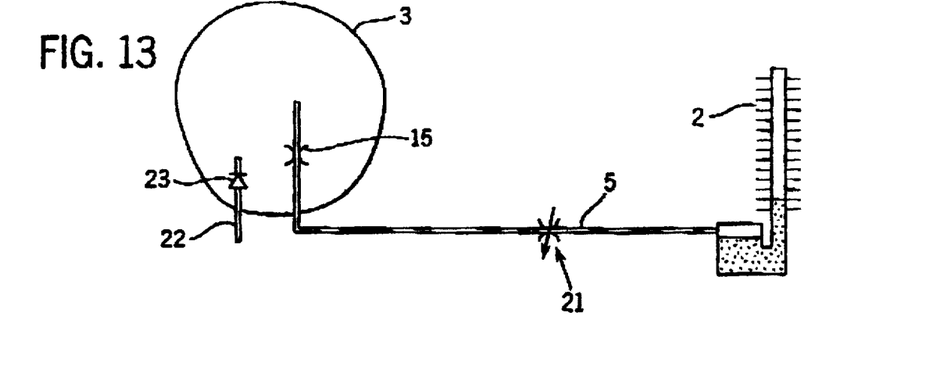
FIG. 13 is a schematic diagram of the medical demonstration apparatus of FIG. 10 following the release of pressure.
Figure 14:
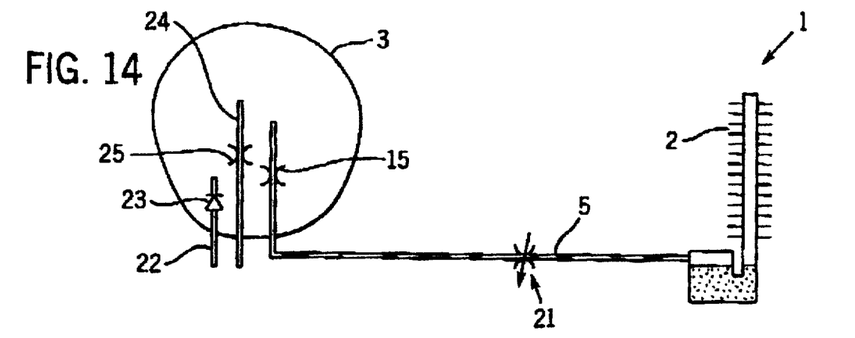
FIG. 14 is a schematic diagram of the medical demonstration apparatus of a fourth embodiment.
Figure 15:
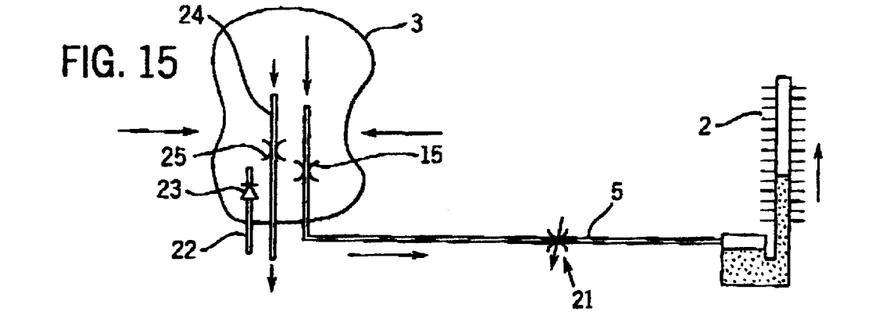
FIG. 15 is a schematic diagram of the medical demonstration apparatus of FIG. 14 when pressure is applied.
Figure 16:
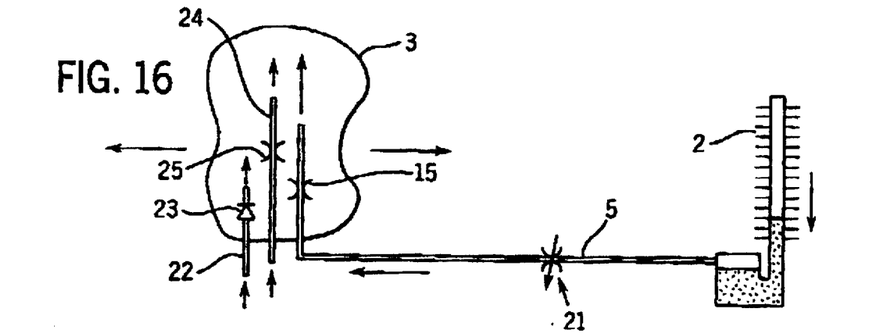
FIG. 16 is a schematic diagram of the medical demonstration apparatus of FIG. 14 when pressure is released.
Figure 17:
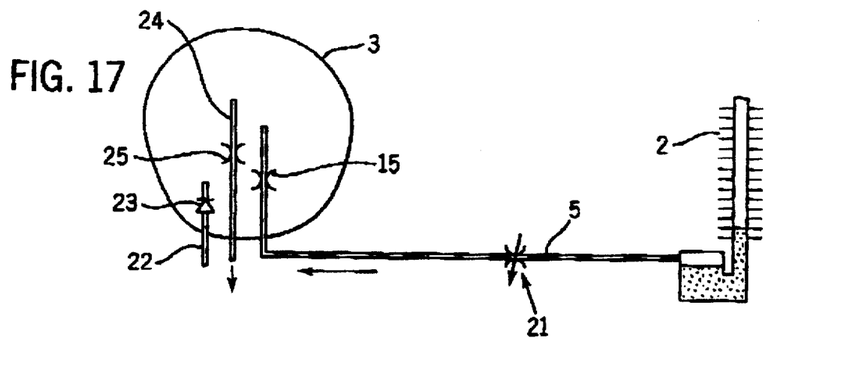
FIG. 17 is a schematic diagram of the medical demonstration apparatus of FIG. 14 following the release of pressure.

The connector 4 (as illustrated in FIGS. 4 & 5) includes a base 10 through which an internal tube 11 passes to an outlet 12. The inlet 8 and outlet 12 are thus able to communicate through the connector 4 for the passing of air therethrough.

The connector 4 includes a cylindrical compartment 13 which communicates with a pipe 14 which is received in one end of the internal tube 11. The connector 4 also includes an aperture 17 which joins the interior of the bulb 3 and the compartment 13.

The operation of the apparatus is as follows. The patient commences manually squeezing the bulb 3 to create pressure on the manometer 2. The air passes through the aperture 17 into the compartment 13 and hence into the internal tube via the pipe 14. The air flows into the tube 5 and through to the manometer 2. When the pressure is relaxed the air travels in the opposite direction.

A pumping action on the heart shaped bulb 3 causes a normal cyclical "blood" pressure reading indicated on the manometer 2. For example, the manometer 2 can read in cyclic fashion between 70 and 130mm Hg. From this, the patient gauges the normal requirements of cardiac exertion through the effort required to squeeze the bulb 3 as well as the pressure indicated on the manometer 2. The internal diameter of the tube 5 is approximately 1mm and this ensures the flow of air is restricted thus regulating the movement of the mercury within the manometer 2. The restriction of the flow of air is represented schematically in FIGS. 1–3 as a restrictor 15.

The patient can vary the frequency of squeezing and the pressure applied to the bulb to experience the substantially greater exertion required to simulate higher blood pressure readings.

Referring to FIGS. 6–9, in practice it is necessary for the apparatus to be adapted to operate with manometers of varying dynamic characteristics. One way to achieve this is to use a second restrictor 21 in the tube 5 which connects the bulb 3 to the manometer 2. In practice this restrictor 21 can be variable or fixed or selected from a family of restrictors. The FIGS. 6–9 illustrate the operation of the apparatus 1 where the second restrictor 21 is variable so that the air circuit of the apparatus 1 can be tuned to suit various manometers 2. Referring to FIGS. 10–13, in this third embodiment an inlet 22 into the bulb 2 is added to the apparatus as illustrated in FIGS. 6–9. The inlet 22 includes a one-way valve 23 which enables the bulb 2 to reinflate via the inlet 22 before the mercury in the manometer 2 falls to zero. When the bulb 3 is fully reinflated at the end of the cycle (FIG. 13) the mercury reading is above zero. That means that the mercury level at this stage of the cycle simulates diastolic blood pressure.

In the arrangement of the fourth embodiment illustrated in FIGS. 14–17, the apparatus further includes a bleed line 24 with a restrictor 25. The bleed line 24 with the restrictor 25 is used to prevent a gradual buildup to the mercury reading in the manometer 2 by allowing excess air pressure to be bled from the bulb 3. The bleed line 24 also allows the reading of the manometer 2 to slowly drop to zero after use.

The apparatus Of the various embodiments is operated by a cyclic sequence of squeezing the bulb 3 to force the air in the bulb into the tube 5 and hence to the manometer 2 in the first embodiment (FIGS. 1–5) the response of the mercury column in the manometer 2 is damped by the restrictor 15. This damping Prevents the mercury column from "bouncing" and appearing too sensitive. The resistor 15 also provides an extra load and this has the effect of providing to the patient greater contrast between the effort required to replicate normal blood pressure and the effort required to replicate high blood pressure in the manometer 2.

The greater squeezing effort applied to the bulb 3 provides a higher reading on the manometer. The apparatus is so tuned by the use of the restrictor 15 that the greater effort required is easily perceived by the patient.

In the second embodiment (FIGS. 6–9), the apparatus is adapted to be used with manometers 2 having varying dynamic characteristics. The variable restrictor 21 allows the apparatus to be used in a similar fashion to the first embodiment where the air within the apparatus is contained therein during its operation.

In the third embodiment (FIGS. 10–13), the inlet 22 ensures that during the operation of the apparatus the mercury column of the manometer 2 does not drop to a zero reading between the cyclic squeezing operation of the bulb 3. When the bulb 3 is reinflated after squeezing, the mercury level returns to a reading which replicates diastolic pressure. That means that the mercury level does not go to zero.

In the fourth embodiment (FIGS. 14–17) the bleed line 24 with the restrictor 25 prevents the gradual buildup of the mercury level. This means that the level should remain relatively constant if the effort in squeezing the bulb 3 is maintained.

Figure 18:
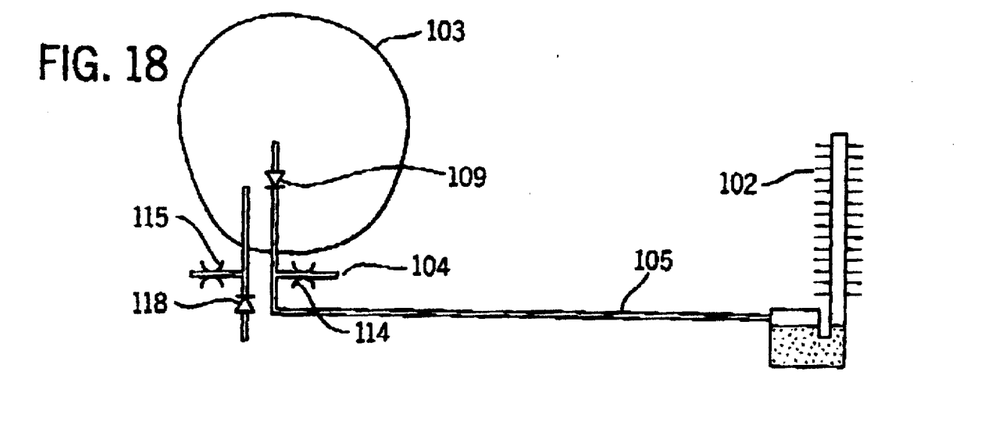
FIG. 18 is a schematic diagram of the medical demonstration apparatus of a fifth embodiment.
Figure 19:
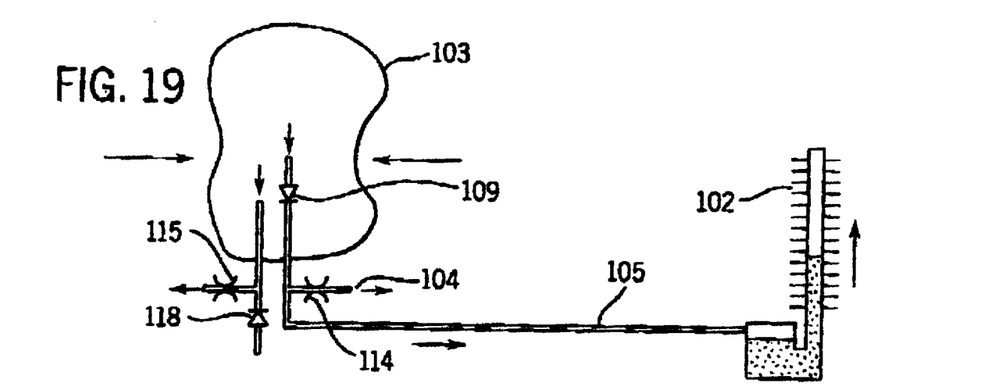
FIG. 19 is a schematic diagram of the medical demonstration apparatus of FIG. 18 when pressure is applied.
Figure 20:
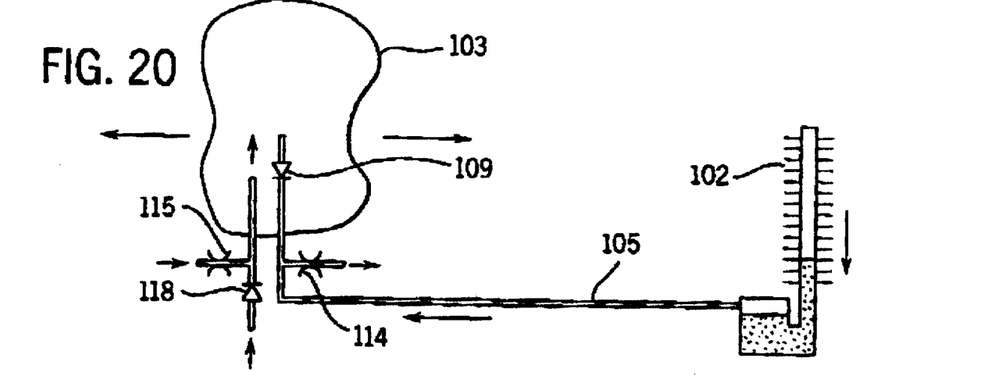
FIG. 20 is a schematic diagram of the medical demonstration apparatus of FIG. 18 when pressure is released.
Figure 21:
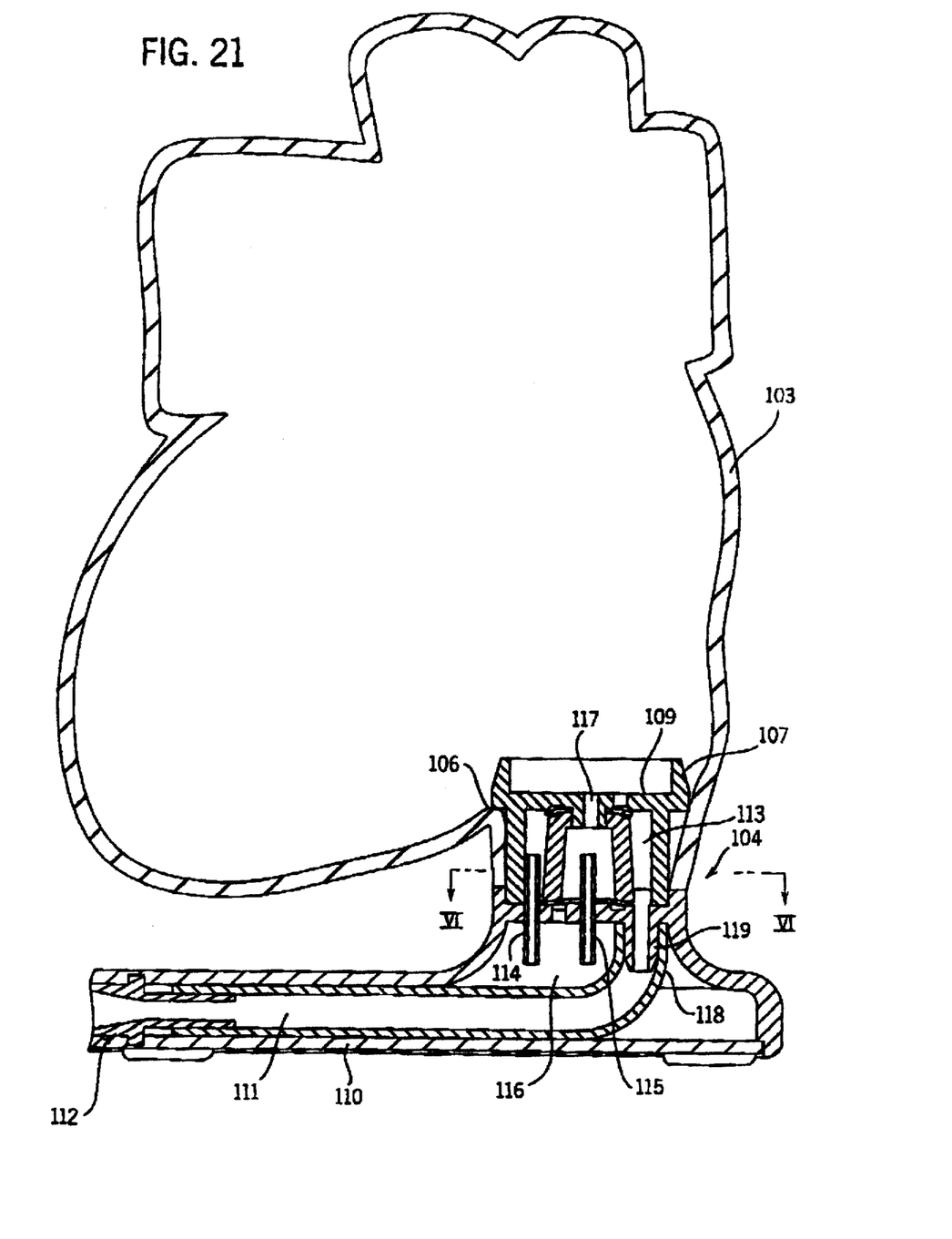
FIG. 21 is a longitudinal cross-sectional view of the medical demonstration apparatus of FIG. 18 illustrating the heart shaped bulb and its base.

Referring to FIGS. 18–20 the medical demonstration apparatus of the fifth embodiment comprises a manometer 102 and a bulb 103. As illustrated in FIG. 21, the bulb 103 is connected via a connector The connector 104 is illustrated in schematic form in FIGS. 18–20 and the manometer 102 is connected to the connector 104 by a tube 105 as illustrated in FIGS. 18–20.

Referring to FIG. 21. the bulb 103 is made from a moulded plastics material and is preferably coloured and shaped to resemble a human heart. The bulb 103 has a single opening 106 which sealing fits over a ringed flange 107 of an inlet 108 of the connector 104. When the bulb 103 is squeezed and then released, air is forced out of and into the bulb 103 accordingly.

Figure 22:
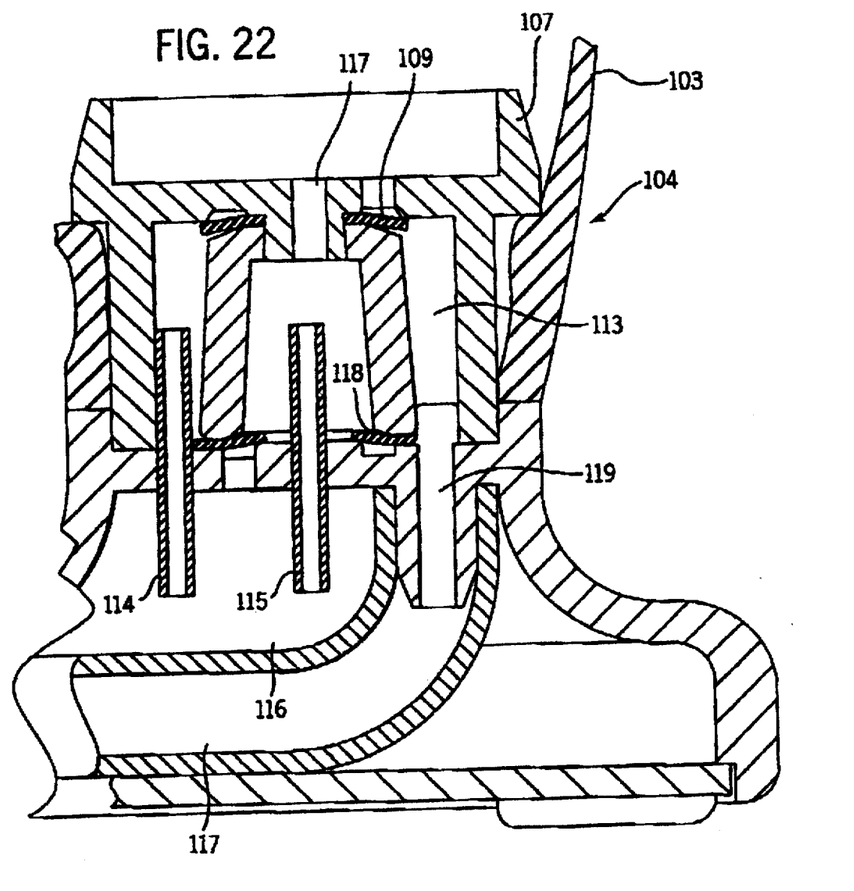
FIG. 22 is a detailed view of the connection between the heart shaped bulb and its base of the apparatus of FIG. 18.
Figure 23:
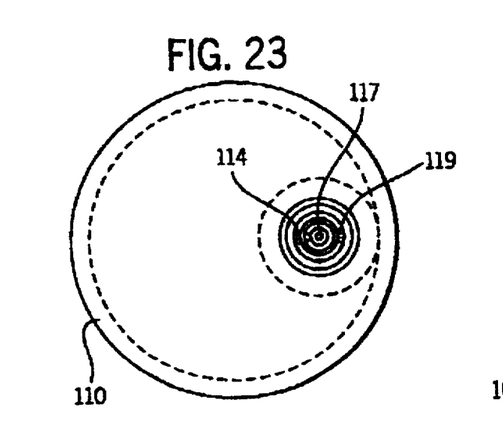
FIG. 23 is a cross-sectional view along the lines VI—VI of FIG. 21.

The connector 104 (as illustrated in FIGS. 21–23) includes a base 110 through which an internal tube 111 passes to an outlet 112. The inlet 108 and outlet 112 are thus able to communicate through the connector 104 for passing of air therethrough.

The connector 104 includes an annular aperture 113 located at the inlet 108. The aperture 113 communicates with a pipe 119 which is received in one end of the internal tube 111. The annular aperture 113 and the pipe 119 communicate by a one way flap valve log. The annular aperture 113 also is connected to a first restrictor 114 which communicates with a chamber 116 within the connector 104. The chamber 116 is open to the atmosphere.

The connector 104 also includes a second aperture 117 which communicates with a second restrictor 115 into the chamber 116 which is open to atmosphere. A second one-way valve 118 prevent air from passing from the bulb 103 to the chamber 116 but allows air from the chamber 116 to pass into the valve in parallel with the first restrictor 114.

The operation of the apparatus is as follows. The patient commences manually squeezing the bulb 103 to create pressure on the manometer 102. The air passes through the annular aperture 113 via the one way flap valve 115 and into the internal tube 111 and out of the outlet 112 into the tube 105 to the manometer 102. At the same time, air passes via the annular aperture 113 through the first restrictor 114 into the chamber 116 and thence into atmosphere. Also at the same time, air passes through the aperture 117 through the second restrictor 115 into the chamber 116 and thence into atmosphere. When the bulb 103 is released the air returns into the bulb 103 simultaneously via the second valve 118 and second restrictor 115 while the air in the tube 105 is bled to atmosphere via the first restrictor 114 via the chamber 116.

A pumping action on the heart shaped bulb 103 causes a normal cyclical "blood" pressure reading indicated on the manometer 102. For example, manometer 102 reading Cycling between 70 and 130mm Hg. From this, the patient gauges the normal requirements of cardiac exertion through the effort required to squeeze the bulb 103 as well as the indicator pressure on the manometer 102.

The patient can vary the frequency of squeezing and the pressure applied to the bulb to experience the exertion required to simulate higher blood pressure readings.

The pumping action of the squeezing of the bulb 103, ensures further air being allowed into the bulb 103 while the air in the tube is bled through the first restrictor 114. The reading on the manometer 102 can be maintained according to the frequency and pressure of the squeezing of the bulb 103.

Figure 24:
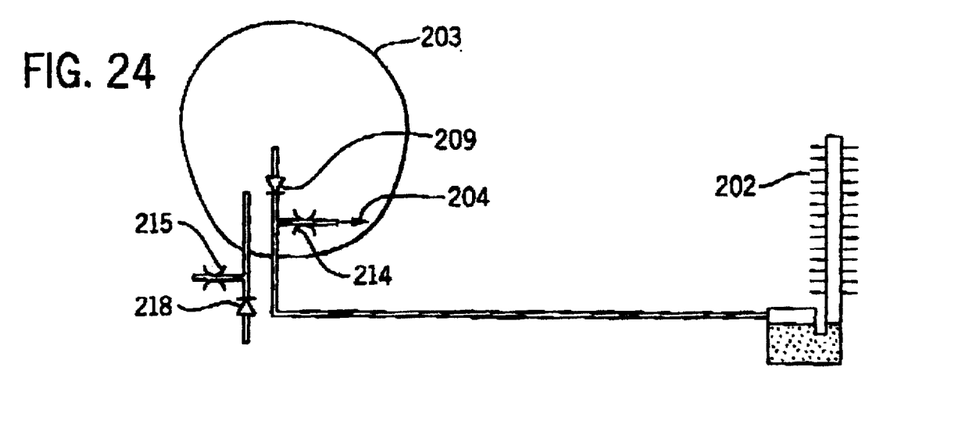
FIG. 24 is a schematic diagram of the medical demonstration apparatus of a sixth embodiment.
Figure 25:
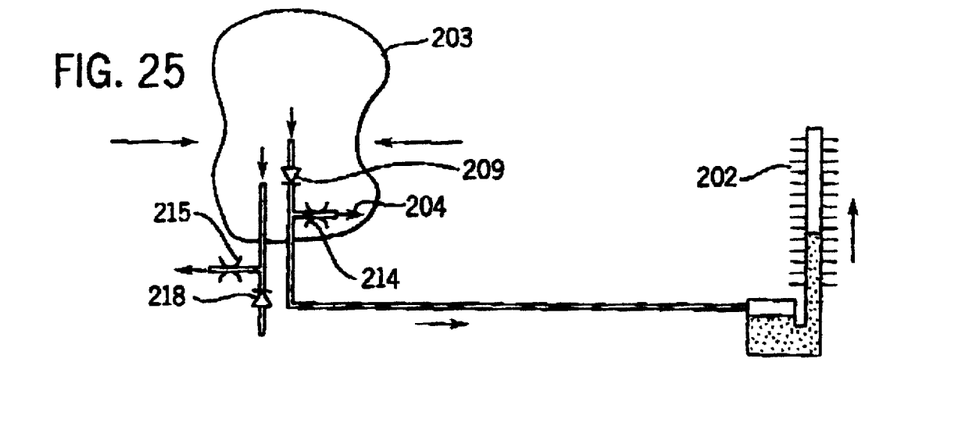
FIG. 25 is a schematic diagram of the medical demonstration apparatus of FIG. 24 when pressure is applied.
Figure 26:
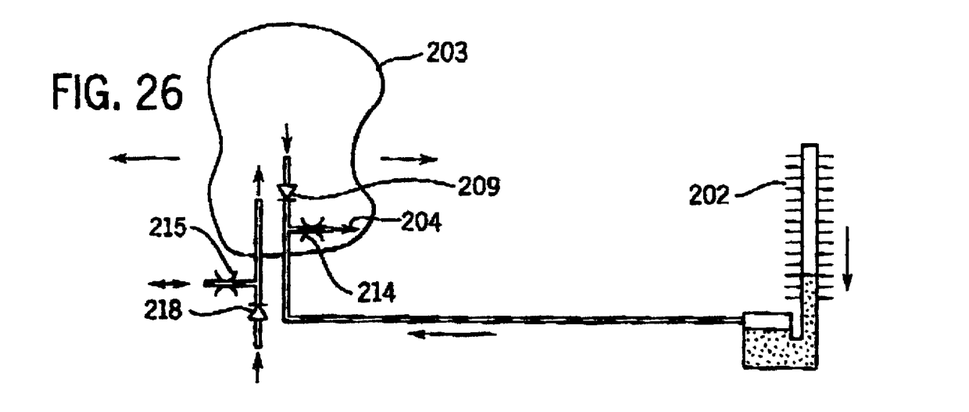
FIG. 26 is a schematic diagram of the medical demonstration apparatus of FIG. 24 when pressure is released.

Referring to FIGS. 24–26, connector 204 is illustrated in a different schematic form. The connector 204 includes a first one way valve 209 and second restrictor 215. The second restrictor 214 is open to the interior of the bulb 203. The second one way valve 218 and the first restrictor 215 are positioned the same way. The difference with the embodiment is how the air is bled from the manometer 202 back to the bulb 203.

Industrial Applicability

There are numerous other advantages associated with the use of the apparatus. For example, the greater perception of the disease on the part of a patient may lessen any resistance for accepting treatment and life style adjustments. Also, the patient is better able to conceptualize the positive effects of treatment, which is usually by means of a course of medication. Further, the patient learns to associate the lowering of blood pressure with the lessening of grip pressure required to operate the apparatus 1 and is therefore better able to accept possible adverse reactions to the therapy.

The apparatus provides a convenient and inexpensive way of communicating a complex medical issue between the medical practitioner and the patient.

The use of the apparatus also provides for a number of advantages to the general public as it can be used in medical and nursing training as well as in general improving community awareness of the problems of high blood pressure and hypertension. As such, morbidity and mortality rates can be lowered.

The medical practitioner also obtains a number of advantages from the use of the apparatus in that its use provides for a basis for the return of the patient for monitoring of the condition and the opportunity to diagnose other diseases. Also it provides for the opportunity to assess other cardiac risk factors. The use of the apparatus 1 saves time and provides an attractive alternative to other methods of communicating that can be, at times, mundane and non-challenging subject matter. It will also be understood, that the apparatus 1 can be used to overcome language barriers as its demonstration requires lessened explanation.

The foregoing describes only some embodiments of the present invention and modifications, obvious to those skilled in the art, can be made thereto without departing from the scope of the present invention.

We claim:

1. A method for demonstrating a relationship of blood pressure to functioning of a simulated heart, the method comprising:

providing an elastically deformable hollow bulb configured and colored to provide a pneumatically operable model of a human heart, said bulb being adapted to be deformed by a person in order to simulate pumping action of the human heart;

measuring with a pressure measurement device an increase in air pressure generated solely as a result of the deformation of the bulb and without deformation of other portions of a pneumatic system which includes the bulb and the pressure measurement device;

directly connecting said bulb and said pressure measurement device without supplying air to any inflatable cuff for sensing blood pressure in the person;

restricting the flow of air between the bulb and the pressure measurement device in order to produce a controllable reading on the pressure measurement device;

bleeding air from the pnuematic system through an air bleed means that continuously provides communication with the atmosphere during all operations of the apparatus; and repeatedly deforming the said hollow bulb while observing a pressure reading displayed by said pressure measurement device and while continuously bleeding air from said pneumatic system through said air bleed means.

2. A medical demonstration apparatus for demonstrating a relationship of blood pressure to functioning of a simulated heart, the apparatus comprising:

an elastically deformable hollow bulb configured and colored to provide a pneumatically operable model of a human heart, said bulb being adapted to be deformed by a person in order to simulate pumping action of the human heart, and a pressure measurement device for measuring an increase in air pressure generated solely as a result of the deformation of the bulb and without deformation of other portions of the pneumatic system, means for directly connecting said bulb and said pressure measurement device without supplying air to any inflatable cuff for sensing blood pressure in the person, and wherein the pneumatic system further comprises at least one air flow restriction for restricting the flow of air between the bulb and the pressure measurement device in order to produce a controllable reading on the pressure measurement device; and wherein the pneumatic system further comprises an air bleed means that continuously provides communication with the atmosphere during all operations of the apparatus; and said apparatus further comprising a one-way valve for admitting air from the atmosphere to the pneumatic system in order to allow the bulb to progressively raise the air pressure in the pneumatic system.

3. A medical demonstration apparatus for demonstrating a relationship of blood pressure to functioning of a simulated heart, the apparatus comprising:

an elastically deformable hollow bulb configured and colored to provide a pneumatically operable model of a human heart, said bulb being adapted to be deformed by a person in order to simulate pumping action of the human heart, and a pressure measurement device for measuring an increase in air pressure generated solely as a result of the deformation of the bulb and without deformation of other portions of the pneumatic system, means for directly connecting said bulb and said pressure measurement device without supplying air to any inflatable cuff for sensing blood pressure in the person, and wherein the pneumatic system further comprises at least one air flow restriction for restricting the flow of air between the bulb and the pressure measurement device in order to produce a controllable reading on the pressure measurement device; and wherein said air flow restriction is a variable air flow restriction that is adjustable for operation at one of a plurality of air resistances.

4. A medical demonstration device as claimed in claim 3 which further comprises a one-way valve for admitting air from the atmosphere to the pneumatic system in order to allow the bulb to progressively raise the air pressure at the pressure measurement device, and air bleed means for reducing the air pressure within the pneumatic system after use.

5. A medical demonstration apparatus as claimed in claim 3 wherein the pressure measurement device is a mercury manometer.

* * * * *